(12) United States Patent
Nielsen et al.

(10) Patent No.: US 8,944,099 B2
(45) Date of Patent: Feb. 3, 2015

(54) VALVE ARRANGEMENT AND METHOD FOR OPERATING A VALVE

(75) Inventors: Peter Gammeljord Nielsen, Vejle (DK); Lars Munch, Vamdrup (DK); Niels Gregersen, Galten (DK); Bjarne Frederiksen, Lemming (DK)

(73) Assignee: Danfoss A/S, Nordborg (DK)

( * ) Notice: Subject to any disclaimer, the term of this patent is extended or adjusted under 35 U.S.C. 154(b) by 267 days.

(21) Appl. No.: 13/325,409

(22) Filed: Dec. 14, 2011

(65) Prior Publication Data

US 2012/0152367 A1    Jun. 21, 2012

(30) Foreign Application Priority Data

Dec. 17, 2010 (DE) .......................... 10 2010 054 979

(51) Int. Cl.
| | |
|---|---|
| F16K 37/00 | (2006.01) |
| G01F 1/684 | (2006.01) |
| F17D 3/01 | (2006.01) |
| G05D 23/19 | (2006.01) |
| F24D 19/00 | (2006.01) |

(52) U.S. Cl.
CPC ........ G05D 23/1931 (2013.01); F16K 37/0041 (2013.01); F24D 19/0007 (2013.01)
USPC ............ 137/552; 137/2; 137/468; 137/487.5; 700/282; 73/40

(58) Field of Classification Search
USPC ........... 137/551, 552, 487.5, 468, 2; 700/282; 73/40
See application file for complete search history.

(56) References Cited

U.S. PATENT DOCUMENTS

| | | | | |
|---|---|---|---|---|
| 4,364,512 A | * | 12/1982 | Morrison | 236/9 A |
| 4,922,233 A | * | 5/1990 | Twerdochlib | 340/606 |
| 5,501,201 A | * | 3/1996 | Miyoshi et al. | 123/568.24 |
| 2012/0211097 A1 | * | 8/2012 | Puttmer | 137/552 |

FOREIGN PATENT DOCUMENTS

| | | |
|---|---|---|
| EP | 1235130 A2 | 8/2002 |
| EP | 1235130 * | 8/2008 |
| GB | 2452043 A | 2/2009 |
| WO | WO 2011026666 A1 * | 3/2011 |

* cited by examiner

*Primary Examiner* — Atif Chaudry
(74) *Attorney, Agent, or Firm* — McCormick, Paulding & Huber LLP

(57) ABSTRACT

A valve arrangement is provided, (1) comprising: a valve (2) for controlling a flow of heating or cooling fluid through a heat exchanger, an actuator (12) for actuating said valve (2), control means (15) for controlling said actuator (12), a first temperature sensor (18) connected to said control means (15), a thermal resistance between the first temperature sensor (18) and the valve (2) being greater than a thermal resistance between the second temperature sensor (19) and the valve (2). It is intended to improve control of the valve. To this end the first temperature sensor (18) and the second temperature sensor (19) are part of detector means detecting a closing condition of the valve (2).

14 Claims, 1 Drawing Sheet

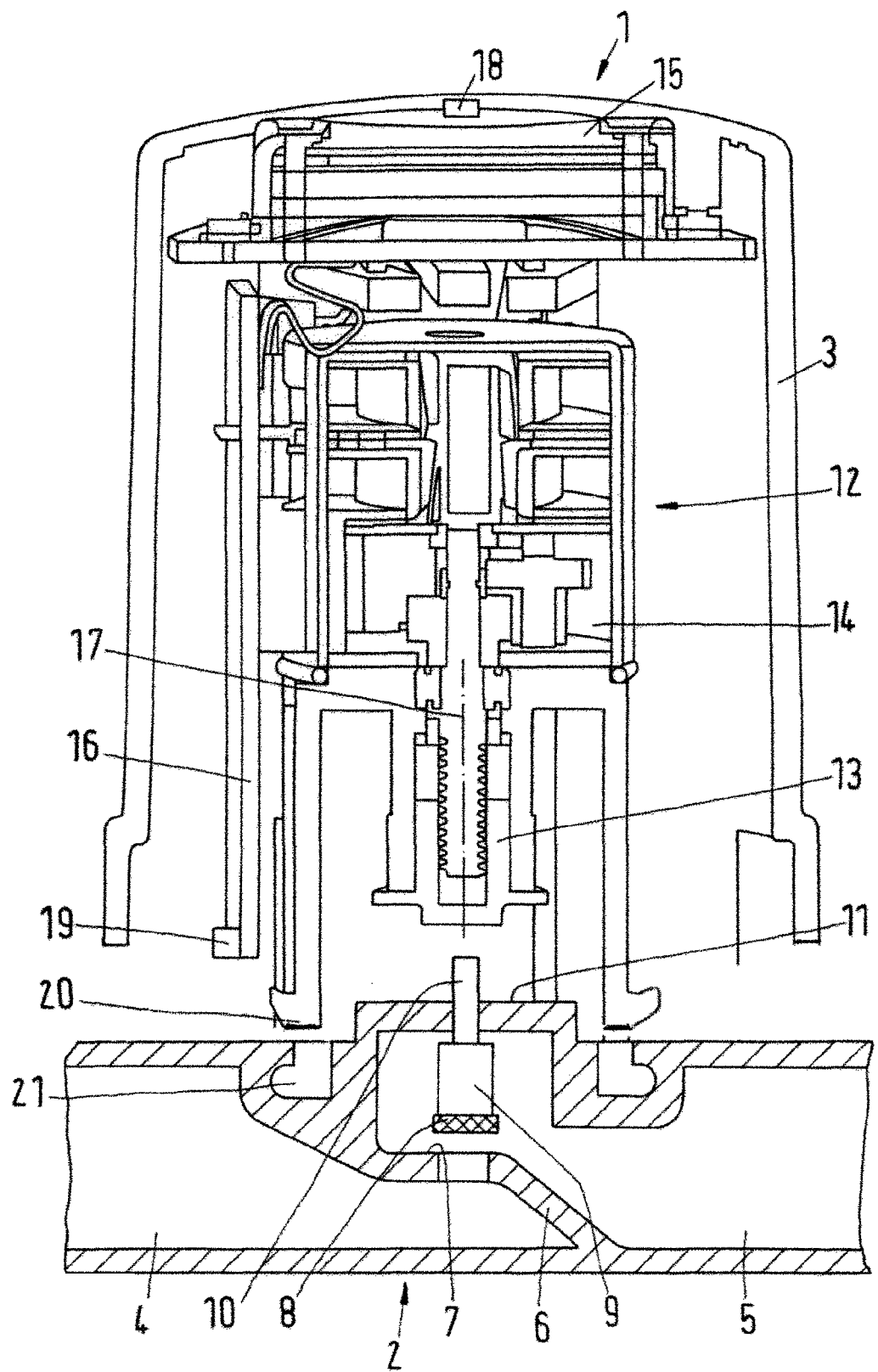

VALVE ARRANGEMENT AND METHOD FOR OPERATING A VALVE

CROSS REFERENCE TO RELATED APPLICATION

Applicants hereby claim foreign priority benefits under U.S.C. §119 from German Patent Application No. DE 10 2010 054 979.7 filed on Dec. 17, 2010, the contents of which are incorporated by reference herein.

TECHNICAL FIELD

The invention relates to a valve arrangement, comprising a valve for controlling a flow of heating or cooling fluid through a heat exchanger, an actuator for actuating said valve, control means for controlling said actuator, a first temperature sensor connected to said control means, and a second temperature sensor connected to said control means, a thermal resistance between the first temperature sensor and the valve being greater than a thermal resistance between the second temperature sensor and the valve.

Furthermore, the invention relates to a method for operating a valve, said valve controlling a flow of heating or cooling fluid through a heat exchanger and being activated by an actuator wherein a first temperature is detected at a predetermined first position relative to the valve and a second temperature is detected at a predetermined position relative to the valve, a thermal resistance between the second position and the valve being smaller than a thermal resistance between the first position and the valve.

BACKGROUND OF THE INVENTION

A valve arrangement of the kind mentioned above and a method for operating a valve as mentioned above are known from GB 2 452 043 A. The first temperature sensor detects the ambient temperature of a room. The second temperature sensor detects a temperature in the vicinity of the valve. The temperature detected by the second temperature sensor is used to calculate a compensation value for the first temperature sensor so that the ambient temperature can be determined with a greater accuracy.

EP 1 235 130 A2 describes a method and an apparatus for controlling a room temperature using two temperature sensors, one of which senses the room temperature and the other of which senses a temperature near the valve. Both temperatures are combined to get more reliable information about the actual room temperature.

A thermostatically controlled valve compares the actual room temperature with a set room temperature and increases the flow of heating fluid, when the actual room temperature is below the set room temperature, and decreases the flow of heating fluid, when the actual room temperature is higher than the set room temperature. In most cases this leads to a slightly oscillating movement of a valve element relative to a valve seat. Such a movement needs energy. When the actuator is driven electrically, waste of energy should be avoided.

Furthermore, for a sophisticated control of the valve, information is necessary about the opening degree of the valve, e.g. the position of the valve element relative to the valve seat.

When an electrically driven actuator is used, this information can be obtained by driving the valve in closing direction until the force necessary to move the valve element increases dramatically. This increase is an indication that the valve element has touched the valve seat and sealing means are compressed. However, such detection requires a large amount of electrical energy as well since the current consumption is non-linearly increasing with the force applied.

SUMMARY OF THE INVENTION

The task underlying the invention is to improve control of the valve.

This task is solved by a valve arrangement of the kind mentioned above in that the first temperature sensor and the second temperature sensor are part of detector means detecting a closing condition of the valve.

This can be explained by way of a simple example: By comparing the two temperatures it is possible to detect whether the valve is open or closed. When the valve is open, the two temperature sensors detect different temperatures. The first temperature sensor detects ambient or room temperature. The second temperature sensor detects a temperature which is higher since the second temperature is arranged thermally closer to the valve. The valve itself has a temperature near the temperature of the heating fluid. The same is true for the use of a cooling fluid. In this case, the second temperature sensor detects a temperature which is lower than the ambient or room temperature. When there is a temperature difference between the two temperature sensors, this is an indication that the valve is open. When there is no temperature difference or the temperature difference is smaller than a predetermined difference, it can be assumed that the valve is closed. In this case there is no fresh heat supplied to the valve by the heating or cooling fluid. Therefore, after a certain time, the valve has almost room or ambient temperature. However, using two or more temperatures can enable the controller to detect also the opening degree of the valve or the position of a valve element relative to a valve seat. In this case, additional parameters might be useful, e.g. a time which is necessary to reach a predetermined temperature difference. A simple way to realise different thermal resistances is to arrange the temperature sensors with different distances relative to the valve.

In a preferred embodiment the actuator is an electric stepping motor, wherein in a detection phase the valve is opened step-wise starting from a starting point in which the valve is closed, the control means detecting and storing the number of a step at which the valve starts to open. The point at which the valve starts to open can be detected by a rise of the temperature detected by the second temperature sensor while the temperature detected by the first temperature sensor does not rise in the same way. To start the detection phase the valve is driven into a state where it can be assumed that the valve is closed. The valve then is opened step by step. At a certain step heating or cooling fluid can pass through the valve. In this case heat is supplied to the valve leading to a temperature rise of the valve which can be detected by the second temperature sensor.

Preferably, the actuator is actuated by a group of steps and said control means comprises a timer means defining a pause between successive groups of steps. When for example the actuator has to make 1000 steps to move the valve from a fully closed condition into a fully open condition, it would be rather time consuming to check the temperature behaviour of the valve after each step. In this case it is advantageous that the actuator is actuated by a number of steps without waiting, e.g. 25 or any other number of steps. After such a group of steps the opening operation is interrupted for a predetermined time. When the valve has started to open, in this time the heat supplied by the heating or cooling fluid has increased the temperature of the valve. If the valve has not started to open, the temperature of the valve remains unchanged. The time needed between successive groups of steps depends on the overall installation, in particular on a length of a line between a heat source or a main supply line and the valve. When such a line is short, the pause can be short.

In a preferred embodiment, said control means comprises a heat source condition input and performs the detection phase only when the heat source condition input indicates that the heat source is active. When the heat source does not produce heat, i.e. does not supply heating or cooling fluid with an elevated or lowered temperature, the temperature of the valve will not change regardless of whether the valve is closed or not. The indication of the working condition of the heat source saves energy since a superfluous actuation of the valve can be avoided.

In a further preferred embodiment said control means comprises an output indicating a closing condition of said valve. This closing condition can be signalled to the heat source. When the heat source detects that all valves in a heating system are closed it is no longer necessary to produce heat or supply a heating or cooling fluid. This saves heating energy.

Furthermore, in a monitoring phase the control means can drive said valve into a closing state and with the help of the first temperature sensor and the second temperature sensor monitor whether said valve is closed. The closing state can be the one previously detected. Such a monitoring phase can be performed once a day or once during another predetermined period. When the valve is driven into a closing state which has been previously detected, after a certain time the temperature detected by the second temperature sensor should be the same as the temperature detected by the first temperature sensor. If this is not the case, this is a reliable indication that the valve is not fully closed. The actuator can use another group of steps to drive the valve in closing direction. When after a time the closing condition can be detected, since both temperature sensors indicate the same temperature, the new step number is stored as information about the closing point.

Preferably, the second temperature sensor is arranged on a support element, said support element extending parallel to an actuating axis of the actuator and protruding over the actuator in a direction towards the valve. The second temperature sensor is arranged in a part of the support which is nearer to the valve. The use of a support element, which can be a printed circuit board (PCB), is a simple way to place the second temperature sensor in the vicinity of the valve.

Preferably, the first temperature sensor and the second temperature sensor are offset in circumferential direction in relation to said actuation axis. In this case, both temperature sensors can be placed at optimum positions.

Furthermore, it is preferred that said support element is part of a thermostatic valve head, said thermostatic valve head having fixing means for fixing said thermostatic valve head to the valve, wherein the second temperature sensor is positioned adjacent to said fixing means. When said thermostatic valve head is fixed to the valve the fixing means must engage the valve. Positioning the second temperature sensor adjacent said fixing means is a simple way to secure that the second temperature sensor is in fact arranged near the valve.

The task is solved by a method of the kind described above in that the first temperature and the second temperature are compared with each other and a closing condition of the valve is detected.

As explained above, the valve is assumed to be closed when the two temperatures are equal or within a small temperature range which is defined by said predetermined value. In other words: a closed state of the valve is detected in case the first temperature and the second temperature differ from each other by a temperature difference which is smaller than a predetermined value. When the temperature difference between the two temperatures is larger than the predetermined value, it is assumed that a heating or a cooling fluid supplies heat (positive or negative) to the valve and increases or decreases the temperature of the valve. In this case the temperature of the valve will differ from the ambient or room temperature. This a clear indication that the valve is not closed.

Preferably, in a detection phase the valve is opened stepwise starting from a starting point in which the valve is closed, and the number of the step in which the valve opens is stored as opening information. When the actuator has the form of a stepping motor, each step defines a certain opening degree of the valve provided that the valve had started to open. When the number of the step at which the valve opens is known, a precise control of the position of the valve element relative to the valve seat is achieved. This makes it possible to take into account a non-linear behaviour of a valve. This non-linear behaviour means that an opening movement of the valve element over a predetermined distance has a greater influence on the flow of heating or cooling fluid through the valve in the vicinity of the closing point than in a situation in which the valve element has a greater distance from the valve seat. The opening and the closing point are considered as being the same.

Preferably, after a group of steps the opening of the valve is interrupted for a predetermined time period and the first temperature and the second temperature are compared at the end of said time period. When the valve is closed there is no flow of heating or cooling fluid through the valve. In this case the first temperature and the second temperature will be the same. This situation changes when the valve starts to open. In this case heat supplied by the heating or cooling fluid increases or decreases the temperature of the valve which in turn leads to an increase or decrease of the second temperature. The opening of the valve is detected by comparing the first temperature and the second temperature.

The detecting phase should preferably be performed only when a heat source supplying the heating or cooling fluid is active. This operating condition of the heat source can be indicated by a signal transmitted from the heat source to the valve control. When the heat source is not active, there will be no temperature change regardless of whether the valve is open or not.

Preferably, in a monitoring phase the valve is driven in a closing state (e.g. previously detected) and it is monitored whether the valve is closed by comparing the first temperature and the second temperature. When the valve has been driven into a closed state, there should be no difference between the two temperatures. When there is still a difference, it is assumed that the valve has not been completely closed and the valve is driven further in the closing direction. The number of steps necessary to drive the valve into the fully closed condition is stored, and the previously stored number is decreased correspondingly.

BRIEF DESCRIPTION OF THE DRAWING

A preferred example of the invention will now be described in more detail with reference to the drawing, wherein the only FIGURE shows a schematic illustration of the valve arrangement.

DETAILED DESCRIPTION OF THE PREFERRED EMBODIMENTS

The only FIGURE shows a valve arrangement 1 having a schematically shown valve 2 and a thermostat head 3.

The valve comprises an inlet 4 and an outlet 5 separated by a bore 6 in which a valve seat 7 is arranged. A valve element 8 cooperates with the valve seat 7. When the valve element 8 rests against the valve seat 7, the valve 2 is closed. When the valve element 8 (as shown) has a certain distance to the valve seat 7, the valve 2 is open and allows a flow of heating or cooling fluid from the inlet 4 to the outlet 5.

The valve 2 has a non-linear characteristic. When the valve element 8 is moved in opening direction by a predetermined stroke of e.g. 1 mm, this movement has a greater influence on the flow of fluid when the valve element 8 is in the vicinity of the valve seat 7 than when the valve element 8 has a greater distance to the valve seat 7. In other words, using the same stroke, the increase of flow is larger when the movement of the valve element 8 starts closer to the valve seat 7.

In order to control the flow of fluid through the valve 2, information about the actual position of the valve element 8 relative to the valve seat 7 is valuable. The way to obtain this information will be described later.

The valve element 8 is connected to a valve spindle 9 which in turn acts together with a push rod 10 which penetrates a housing 11. Sealing means are provided but not shown. Furthermore, the valve element 8 can be preloaded by a spring (not shown) in an opening direction, i.e. in a direction away from the valve seat 7.

The thermostat head 3 which is shown separated from the housing 11 comprises an actuator 12 in form of a stepping motor which is connected to a driving spindle 13 via a gear 14. The driving spindle 13 is moved in a direction towards the housing 11, when the valve 2 should be closed and in an opposite direction when the valve 2 should be opened. The energy necessary for operating the actuator 12 can be supplied by a battery. Therefore, the energy consumption should be as small as possible. A swinging movement of the valve element 8 should be avoided.

The actuator is controlled by control means 15 which are shown schematically only. The control means 15 can comprise more elements than the box shown.

A support 16 in the form of a printed circuit board (PCB) is arranged parallel to an actuating axis 17 and extends in a direction towards the housing 11 of the valve. In this direction, the support element 16 is longer than the actuator 12.

A first temperature sensor 18 is arranged at a front face of the thermostat head 3 sensing a first temperature which is considered as ambient or room temperature. A second temperature sensor 19 is arranged at an end of the support element 16 neighbouring the housing 11. When the thermostat head 3 is mounted to the housing 11 of the valve 2, this second temperature sensor 19 is arranged in close proximity to the housing 11 and therefore is able to detect the temperature of the housing 11 or a temperature closely related to this temperature.

The thermostat head 3 comprises fixing means 20 which are used to fix the thermostat head 3 to the housing 11. The housing 11 has a corresponding fixing geometry 21. The second temperature sensor 19 is arranged adjacent to said fixing means 20.

Furthermore, it can be seen that the first temperature sensor 18 and the second temperature sensor 19 are offset relatively to each other in circumferential direction, when the circumferential direction is related to the actuating axis 17.

In a valve according to the state of the art the position of the valve element 2 relative to valve seat 7 has been detected in the following way: The valve element has been moved in direction to the valve seat 7. When the valve element 8 has touched the valve seat 7 the force necessary to move the valve element further in the direction towards the valve seat 7 has increased. The valve element 8 which is usually made of an elastomeric material has been compressed. The increase in force usually is connected with an increase of the current consumption which could be detected by the control means 15. However, such procedure is energy consuming and does not allow a precise determination of the closing point (or opening point, respectively) of the valve 2.

The valve arrangement 1 shown gives a further possibility to determine the closing point with a rather high accuracy.

The valve 2 is driven in a condition in which it is closed. This condition can be easily approved by comparing a first temperature detected by the first temperature sensor 18 and a second temperature detected by the second temperature sensor 19. If there is a difference between these two temperatures exceeding a predetermined value, this is a clear indication that there is still a flow of heating or cooling fluid from a heat source (not shown) through the valve. This heating or cooling fluid supplies heat to the housing 11 of the valve 2 (or removes heat from the housing 11) so that the temperature difference will be maintained.

When the valve 2 is closed, there is no flow of heating or cooling fluid through the valve 2, and therefore no supply of heat to the housing 11. After a short time, the temperature detected by the second temperature sensor 19 will be the same as the temperature detected by the first temperature sensor 18 (or within an allowable range around this temperature).

This is an indication that the valve 2 is properly closed.

Another possibility of making sure that the valve 2 is closed is to drive the actuator 12 (stepping motor) with a predetermined number of steps in closing direction. This number should be chosen so high that the valve 2 is reliably closed.

The actuator 12 has e.g. a stroke of 1000 steps. Each position of the driving spindle 13 is allocated to a step number. Therefore, when the actual step number is known, the position of the driving spindle 13 is known as well.

In order to detect an opening point of the valve 2, the actuator moves the driving spindle 13, e.g. by 25 steps in opening direction. Thereafter, a timer means of the control means 15 controls a pause of a predetermined length. When at the end of the pause the temperatures detected by the two temperature sensors 18, 19 are the same, this is an indication that the valve is still closed. In this case the operation is repeated, e.g. the actuator 12 is operated again to move the driving spindle 13 in opening direction by another 25 steps. Again, the temperatures detected by the two temperature sensors 18, 19 are compared. An opening of the valve 2 is detected when the temperature detected by the second temperature sensor 19 is higher (or lower) than the temperature detected by the first temperature sensor 18. Since the control means 15 has counted the number of steps up to this point, the control means 15 has clear information about the number of the step at which the valve 2 starts to open. In the example described there is a maximum error of 25 steps which is acceptable.

The thermostat head 3 receives a signal from a heat source (not shown) indicating whether the heat source is active or not. If the heat source is not active and does not supply heating or cooling fluid, there will be no difference between the temperatures detected by the two temperature sensors 18, 19 regardless of whether the valve 2 is closed or not.

Furthermore, it is preferable that the thermostat head 3 signals to the heat source whether the valve 2 is closed or not. When the heat source knows that all valves connected to said heath source are closed, it is not necessary to be active. It is also possible that the thermostat head 3 signals to the heat source that the supply temperature must be increased or decreased in order to satisfy a heat demand. All communications can be made via a signal line or wireless via a sender-receiver arrangement.

It is possible that the settings of the valve 2 (or the combination of valve 2 and thermostat head 3) change with the time.

Therefore, it is possible to detect the "true" closing point of the valve 2, e.g. once a day. In this case the valve 2 is driven in closing direction, e.g. each time by a group of 25 steps. After each group the temperatures of the first temperature sensor 18 and of the second temperature sensor 19 are compared with each other (preferably a predetermined time period after the movement). When both temperatures are the same, this is an indication that the valve 2 is closed.

When the step number at which the valve 2 has been closed differs from the previously determined step number, the new step number is stored as closing or opening point.

The detection of the closing point can be performed during normal operation also. In most cases at least once a day the control means 15 will detect the necessity to close the valve 2, e.g. when the ambient or room temperature detected by the first temperature sensor 18 is higher than a preset temperature. This closing operation can also be used to monitor the closing point.

In the monitoring phase or in the detection phase the pause between successive actuations of the valve 2 should be in the magnitude of several minutes, e.g. 5 minutes. The optimum length of this pause depends on the heating or cooling plant in which the valve arrangement 1 is positioned. When a line between the valve 2 and the heat source is short, the heating or cooling liquid reaches the valve 2 faster than in a system in which the line is longer. Therefore, the length of said pause is preferably adjustable.

While the present invention has been illustrated and described with respect to a particular embodiment thereof, it should be appreciated by those of ordinary skill in the art that various modifications to this invention may be made without departing from the spirit and scope of the present.

What is claimed is:

1. A valve arrangement comprising: a valve for controlling a flow of heating or cooling fluid through a heat exchanger, an actuator for actuating said valve, control means for controlling said actuator, a first temperature sensor connected to said control means, and a second temperature sensor connected to said control means, a thermal resistance between the first temperature sensor and the valve being greater than a thermal resistance between the second temperature sensor and the valve, wherein the first temperature sensor and the second temperature sensor are part of detector means detecting a closing condition of the valve based on temperatures sensed by the first temperature sensor and the second temperature sensor.

2. The valve arrangement according to claim 1, wherein the actuator is an electric stepping motor, wherein in a detection phase the valve is opened step-wise starting from a starting point in which the valve is closed, the control means detecting and storing the number of a step at which the valve starts to open.

3. The valve arrangement according to claim 2, wherein said actuator is actuated by a group of steps and said control means comprises a timer means defining a pause between successive groups of steps.

4. The valve arrangement according to claim 2, wherein said control means comprises a heat source condition input and performs the detection phase only when the heat source condition input indicates that the heat source is active.

5. The valve arrangement according to claim 1, wherein said control means comprises an output indicating a closing condition of said valve.

6. The valve arrangement according to claim 1, wherein in a monitoring phase the control means drives said valve in a closing state and monitors with the help of the first temperature sensor and the second temperature sensor whether said valve is closed.

7. The valve arrangement according to claim 1, wherein the second temperature sensor is arranged on a support element, said support element extending parallel to an actuating axis of the actuator and protruding over the actuator in a direction towards the valve.

8. The valve arrangement according to claim 7, wherein the first temperature sensor and the second temperature sensor are offset in circumferential direction in relation to said actuation axis.

9. The valve arrangement according claim 7, wherein said support element is part of a thermostatic valve head, said thermostatic valve head having fixing means for fixing said thermostatic valve head to the valve, wherein the second temperature sensor is positioned adjacent to said fixing means.

10. A method for operating a valve, said valve controlling a flow of heating or cooling fluid through a heat exchanger and being activated by an actuator wherein a first temperature is detected in a pre-determined first position relative to the valve and a second temperature is detected at a predetermined second position relative to the valve, a thermal resistance between the second position and the valve being smaller than a thermal resistance between the first position and the valve, wherein the first temperature and the second temperature are compared with each other and a closing condition of the valve is detected based on the comparison of the first temperature and the second temperature.

11. The method according to claim 10, wherein in a detection phase the valve is opened stepwise starting from a starting point in which the valve is closed, and the number of the step in which the valve opens is stored as opening in-formation.

12. The method according to claim 11, wherein after a group of steps the opening of the valve is interrupted for a predetermined time period and the first temperature and the second temperature are compared at the end of said time period.

13. The method according to claim 11, wherein the detecting phase is performed only when a heat source supplying the heating or cooling fluid is active.

14. The method according to claim 10, wherein in a monitoring phase the valve is driven in a closing state and it is monitored whether the valve is closed by comparing the first temperature and the second temperature.

* * * * *